United States Patent Office 3,099,106
Patented July 30, 1963

3,099,106
TREATMENT OF POTATOES WITH S-TRIAZINE COMPOUND
Eric Callander Edgar, Bracknell, England, assignor to Imperial Chemical Industries Limited, London, England, a corporation of Great Britain
No Drawing. Filed Nov. 6, 1961, Ser. No. 150,199
Claims priority, application Great Britain Nov. 11, 1960
13 Claims. (Cl. 47—1)

This invention relates to a process in which potato tubers before being planted are treated with an aphicidal s-triazine compound in order to increase the resistance to aphid attack of potato plants grown from the tubers.

The infestation of potato plants by aphids, for example *Myzus persicae*, has for long been a serious problem to which no satisfactory solution has hitherto been found. Aphid infestation not only results in damage to the potato plants due to the feeding of the aphids on the growing shoots, but more important, results in the spread of virus infections for which the aphids act as carriers. Once a potato plant has become infected, the virus extends to the new potato tubers carried by the plant and thereby renders them unsuitable for planting in the following season.

It has been realized that successful chemical control of virus infections of potatoes depends upon being able to prevent the breeding and dispersal of virus-carrying aphids within the crop and though substances have been available for use as foliage sprays against the aphids which infest potato plants, in practice it has proved difficult to apply the sprays in such a way as to obtain satisfactory protection for the whole crop early in the growing season. As much as 10 days can elapse between the date of the appearance of the first aerial shoots and the date when all the potatoes in the crop have produced aerial shoots. If a spray is applied during this period only part of the crop will be treated whereas if spraying is delayed until all the tubers have produced aerial shoots, then the aerial shoots first to appear may by that time be infested.

The only way in which satisfactory control could be obtained using a foliage spray would be to spray the crop at frequent intervals during the period when new aerial shoots are appearing, but this is clearly much too expensive to be put into practice. Moreover, compaction of soil by land-spraying machines results in reduced yields. In fact, it is customary to wait until about 75% of the planted tubers have produced aerial shoots before applying a foliage spray and by this time it is commonly found that the tubers which were first to produce aerial shoots have become infested with aphids and consequently with virus disease.

We have now found according to this invention that if the potato tubers are treated with an s-triazine compound as hereinafter specified, the potato plants subsequently obtained from the tubers are toxic to aphids.

The invention consists in one aspect in a process in which potato tubers for planting are treated with an s-triazine derivative of the formula:

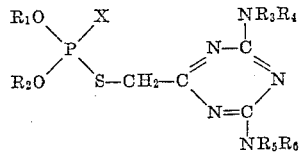

or an acid addition salt thereof, where $R_1$ and $R_2$ stand for methyl or ethyl radicals; $R_3$, $R_4$, $R_5$, and $R_6$ which can be the same or different, stand for a hydrogen atom or for a methyl, ethyl, propyl or butyl radical, provided that $R_3$, $R_4$, $R_5$, and $R_6$ together have a total number of carbon atoms not exceeding six; and X stands for an oxygen or a sulphur atom. The term "s-triazine compound" is used in this specification to mean an s-triazine derivative of the formula defined above and its acid addition salts.

s-Triazine compounds of particular interest are those in which $R_3$ and $R_4$ both stand for hydrogen, for example 2-dimethoxyphosphinothioylthiomethyl-4:6-diamino-s-triazine (referred to below by its common name "menazon"), and
2-dimethoxyphosphinothioylthiomethyl-4-amino-6-methylamino-s-triazine.
2-diethoxyphosphinothioylthiomethyl-4:6-diamino-s-triazine;
2-diethoxyphosphinylthiomethyl-4:6-diamino-s-triazine;
2-dimethoxyphosyhinylthiomethyl-4:6-diamino-s-triazine;
2-dimethoxyphosphinothioylthiomethyl-4-amino-6-dimethylamino-s-triazine.

Menazon in particular has a low mammalian toxicity and good chemical stability unlike many other highly-active phosphorus aphicides. These valuable properties permit potato tubers which have been treated with menazon to be stored and handled conveniently. Thus, it is possible, for example, to treat the tubers before they have begun to sprout.

Where an acid addition salt of an s-triazine derivative is used it can be a salt of an inorganic acid, for example a hydrochloride, or a salt of an organic acid, for example an oxalate, p-toluene sulphonate or an isethionate.

The s-triazine compound can, for example, be applied to the tubers either before the tubers are planted, at the time of planting or after planting. The compound can be applied in the form of a liquid composition consisting of a solution or dispersion of the s-triazine compound in water or a suitably nonphytotoxic organic solvent. Such liquid compositions can be applied, for instance, by being sprayed on to the tubers, by dipping the tubers into the liquid or by being injected into the soil in the vicinity of the tubers after planting. Where the liquid composition is a dispersion it can contain a dispersing agent and any other formulation adjuvants known to the art as being useful in preparing dispersions.

Where the s-triazine compound is applied at the time of planting it can, for instance, be introduced into the planting hole or drill either before or after the tuber, but before the earth is closed over the tuber. In these circumstances the compound can conveniently be applied in the form of granules.

The exact mechanism by which the s-triazine compound is assimilated by the potato plant which grows from the tuber is not clear, but it appears that the compound acts by way of the roots of the plant rather than through the skin of the tuber.

The s-triazine compound can, if desired, be applied in the form of a powder composition in which it is in admixture with a powder diluent, for example china clay, fuller's earth, talc or bentonite.

The activity of the various s-triazine compounds in the process of this invention depends to some extent upon the type of formulation in which they are applied to the tubers, and it appears that it is preferable to formulate the s-triazine compound in such a way as to increase its water-solubility. In this respect results have indicated that it is better to use a water-soluble acid addition salt (for instance the hydrochloride) of the s-triazine rather than the s-triazine itself.

The amounts in which the various s-triazine compounds are used in the processes of this invention naturally depends upon the inherent aphicidal activity of the compound and also depends to some extent upon the way in which it is applied to the tubers. The appropriate amounts necessary to obtain satisfactory results can easily be ascertained by carrying out simple tests on sample tubers. However, where menazon is used as the s-triazine compound it has been found that very good results have been obtained using it at the rate of one lb./ton of tubers.

The term "potato tuber" as used in this specification includes whole tubers and portions of tubers obtained by cutting whole tubers.

The invention is illustrated by the following example.

EXAMPLE

This example described a process in which potato tubers were treated with menazon and describes the increase in yield of new potato tubers obtained despite heavy infestation of the potato plants with aphids.

The menazon was first formulated as a dispersible powder from the following ingredients:

| | Parts by weight |
|---|---|
| Menazon | 80.0 |
| Spestone china clay | 9.5 |
| Calcium lignosulphonate | 5.0 |
| Potassium hydrogen phthalate | 5.0 |
| Sodium salt of naphthalene sulphonic acid | 0.5 |
| | 100.0 |

In the above mixture the calcium lignosulphonate used was that sold under the trade name Wafex Goulac and the sodium salt of naphthalene sulphonic acid used was that sold under the trade name Perminal BX. The menazon material used in preparing the dispersible powder was a technical product whose analysis showed that it contained not less than 70% by weight of pure menazon. The word "Spestone" is a British trade name for a high quality china clay.

The ingredients were first mixed in a ribbon blender, then ground together in a Kolliplex mill and then finally mixed once again in the ribbon blender. The product obtained was a dispersible powder which was then used in treating potato tubers as follows.

Five sprouting potato tubers (variety Sharpe's Express) together weighing about one pound were sprayed with an aqueous dispersion obtained by dispersing 0.145 gram of the dispersible powder in 10 ml. of water. This spraying corresponded to a rate of treatment in the field of about ½ lb. of pure menazon per acre (assuming a planting rate of 1 ton of tubers per acre). The sprayed tubers were then each planted in a 12 inch pot containing John Innes potting compost. Five similar potato tubers were sprayed with 10 ml. of an aqueous dispersion of menazon having double the concentration referred to above and thus corresponding to a rate of treatment in the field of about 1 lb. per acre (assuming again a planting rate of 1 ton of tubers per acre). As a control, five potato tubers were planted in a similar manner to the sprayed tubers, but without having been sprayed. All the pots containing the tubers were then placed in a cool glasshouse.

21 days after planting the tubers, when the haulm was 3–6 inches high, the plants were artificially infested with aphids—*Myzus persicae*—and this infestation was repeated at intervals of 3 or 4 days during the suceeding two months.

It was found that all the aphids infesting the plants growing from the treated tubers died within 3 days of each infestation up to a date 5 weeks after planting. After that date individual aphids survived, but there was no build-up of aphid population. The aphids on the control plants growing from the untreated tubers increased in numbers up to a date 9 weeks after planting to give a very severe and damaging infestation, but after this date their numbers declined due to high glasshouse temperatures and parasitism. The haulm from the treated tubers was much more vigorous than from the untreated which was stunted and yellowed by aphid feeding. No phytotoxicity was observed in any of the plants growing from the treated tubers.

Potatoes harvested nine weeks after planting from two replicates of the 1-lb/acre treatment were examined but no detectable residues of menazon were present.

Three replicates of each treatment rate were harvested 13 weeks after planting and the weight of new potato tubers obtained is given in the table below together with the weight of tubers obtained from three of the control plants.

It will be seen that tubers treated respectively at the 1 lb./acre and ½ lb./acre rates both produced more than twice the weight of new potato tubers obtained from the untreated tubers used as control.

Table

| Treatment | Total yield from 3 plants (grams) |
|---|---|
| 1 lb./acre | 1,308 |
| ½ lb./acre | 1,344 |
| Control untreated | 626 |

The results of the glasshouse tests described above have been confirmed in replicated field trials using menazon at rates of approximately 1, 1¼ and 2 lb./acre, and a high degree of control of aphids has been obtained for as much as 10 weeks after planting.

What I claim is:

1. A process in which potato tubers for planting are treated with an s-triazine derivative of the formula:

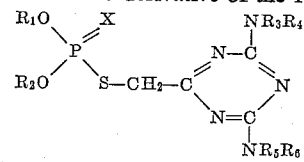

where $R_1$ and $R_2$ are selected from the group consisting of methyl and ethyl; $R_3$, $R_4$, $R_5$ and $R_6$ are selected from the group consisting of hydrogen, methyl, ethyl, propyl and butyl, provided that $R_3$, $R_4$, $R_5$ and $R_6$ together have a total number of carbon atoms not exceeding six; and X is selected from the group consisting of oxygen and sulphur.

2. A process of growing potatoes from potato tubers, in which the tubers have their roots in earth containing an s-triazine derivative of claim 1.

3. A process according to claim 2, in which the tubers are each put into an opening in the earth and the s-triazine derivative is introduced into the opening before the earth is closed over the tuber.

4. A process according to claim 3, in which the s-triazine derivative is introduced into the opening in the form of granules.

5. A process according to claim 1, in which the s-triazine derivative is one where $R_3$ and $R_4$ both stand for hydrogen atoms.

6. A process according to claim 1, in which the s-triazine derivative is 2-dimethoxyphosphinothioylthiomethyl-4:6-diamino-s-triazine.

7. A process according to claim 6, in which the amount of s-triazine compound used is about one lb./ton of potato tubers.

8. A process according to claim 1, in which the s-triazine derivative is 2-dimethoxyphosphinothioylthiomethyl-4-amino-6-methyl-amino-s-triazine.

9. A process according to claim 1, in which the s-triazine derivative is used in the form of one of its acid addition salts.

10. A process according to claim 9, in which the salt is a hydrochloride.

11. A process according to claim 1, in which the s-triazine compound is in the form of a dispersion in a suitably non-phytotoxic liquid.

12. A process according to claim 1, in which the potatoes are treated with a member of the group consisting of the s-triazine derivative and a salt thereof, after the tubers have begun to sprout.

13. Potato tubers which have been treated by the process according to claim 1.

References Cited in the file of this patent

UNITED STATES PATENTS

| | | |
|---|---|---|
| 2,571,989 | Schrader | Oct. 16, 1951 |
| 2,725,331 | Haubein | Nov. 29, 1955 |
| 2,809,469 | Hartley | Oct. 15, 1957 |
| 2,980,581 | Schrader | Apr. 18, 1961 |

OTHER REFERENCES

Wainscott, T. L. Plant Systemics Control Crop Insects. In Successful Farming (Magazine), vol. 57, No. 9, pages 50, 51, 92, September 1959, S1, S9.